United States Patent [19]
Fishman et al.

[11] Patent Number: 5,594,462
[45] Date of Patent: Jan. 14, 1997

[54] CALIBRATING DATA TRANSMISSION LINE SPACING ON A FRAME-SCANNING DISPLAY DEVICE FOR OPTICALLY TRANSMITTING DATA TO A PORTABLE PROGRAMMABLE DEVICE

[75] Inventors: Neil S. Fishman, Bothell; J. Mark Miller, Kirkland, both of Wash.; Thomas J. Dvorachek, III, Kensington; Philip Brzezinski, Middlebury, both of Conn.

[73] Assignees: Microsoft Corporation; Timex Corporation

[21] Appl. No.: 436,987

[22] Filed: May 5, 1995

[51] Int. Cl.⁶ .................................................. G09G 5/00
[52] U.S. Cl. .................... 345/2; 345/1; 345/169; 364/514 R
[58] Field of Search ................ 345/1, 2, 3, 132, 345/169; 364/514

[56] References Cited

U.S. PATENT DOCUMENTS

| | | | |
|---|---|---|---|
| 3,760,373 | 9/1973 | Bartz | 345/183 |
| 4,130,738 | 12/1978 | Sandstedt | 359/147 |
| 4,534,012 | 8/1985 | Yokozawa | 364/900 |
| 4,663,766 | 5/1987 | Bremer | 375/225 |
| 4,853,682 | 8/1989 | Asano et al. | 345/169 |
| 4,999,617 | 3/1991 | Uemura et al. | 340/706 |
| 5,307,297 | 4/1994 | Iguchi et al. | 345/169 |
| 5,488,571 | 1/1996 | Jacobs et al. | 364/705.07 |

*Primary Examiner*—Richard Hjerpe
*Assistant Examiner*—Kent Chang
*Attorney, Agent, or Firm*—Lee & Hayes, PLLC

[57] ABSTRACT

The invention includes systems and methods for calibrating bit transmission rates in a computer system which uses selected raster lines of a frame-scanning display device for serial data transmission to an external receiving device. A system in accordance with the invention includes a data processor and a frame-scanning display device having a total number of available raster lines per display frame. The computer also has an internal timer which is set to generate timing signals at a predetermined frequency. The data processor is programmed to count the number of timing signals and the number of frame scans of the frame-scanning display device which occur during a selected measurement period. The selected measurement period is preferably defined by the occurrence of a predetermined number of frame scans. The data processor is further programmed to calculate a frame scan period of the frame-scanning display device based upon the predetermined frequency of the timing signals, the predetermined number of timing signals, and the number of frame scans counted while counting the predetermined number of timing signals. The frame scan frequency is used to determine the correct spacing of the data transmission raster lines relative to each other within the total number of available raster lines. This spacing establishes a desired serial transmission bit rate to the external receiving device.

27 Claims, 4 Drawing Sheets

CALIBRATING DATA TRANSMISSION LINE SPACING ON A FRAME-SCANNING DISPLAY DEVICE FOR OPTICALLY TRANSMITTING DATA TO A PORTABLE PROGRAMMABLE DEVICE

TECHNICAL FIELD

This invention relates to systems and methods for transmitting data using selected raster lines of a frame-scanning display device such as a CRT (cathode ray tube).

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Some of the more common electronic organizers are akin to handheld calculators. They have a full input keyboard with both numeric keys and alphabet keys, as well as special function keys. The organizers also have a liquid crystal display (LCD) which often displays full sentences and rudimentary graphics.

Pocket-size personal organizers prove most useful to busy individuals who are frequently traveling or always on the move from one meeting to the next appointment. Unfortunately, due to their hectic schedules, these individuals are the people most likely to forget their personal organizers during the frantic rush to gather documents, files, laptops, cellular phones, and travel tickets before heading off to the airport or train depot. It would be desirable to reduce the number of electronic devices that these individuals need to remember for each outing.

Electronic watches have evolved to the point that they can function as personal organizers. Like the pocket-size devices described above, such watches can be programmed with certain key appointments, tasks, phone numbers, flight schedules, alarms, birthdays, and anniversaries. Since watches are part of everyday fashion attire, they are more convenient to carry and less likely to be forgotten by busy people. However, it is much more difficult to enter data into a watch than it is to enter the same data into a pocket-size personal organizer. This difficulty is due in large part to the limited number of input buttons and display characters available on reasonably-sized watches. Most watches are limited to having only three or four input buttons. A wearer programs a watch by depressing one or more buttons several times to cycle through various menu options. Once an option is selected, the user depresses another button or buttons to input the desired information. These input techniques are inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, it is common for many people to maintain appointment calendars and task lists on their personal computers. One example time management software is Microsoft's® Schedule™ for Windows® which maintains daily appointment schedules, to-do lists, personal notes, and calendar planning. This information is often a duplicate of that maintained on the portable personal organizer.

Timex Corporation of Middlebury, Conn., has recently introduced the Timex® Data-Link™ watch. This watch utilizes new technology for transferring information from a personal computer to a watch. This system is more fully disclosed and described in U.S. patent application Ser. No. 08/155,326 filed Oct. 22, 1993, now U.S. Pat. No. 5,488,571, in the names of Jacobs and Insero, and assigned to Timex Corporation. The watch case has an optical sensor which is connected to a digital serial receiver, better known as a UART (universal asynchronous receiver/transmitter), which is incorporated into an integrated circuit controlling the time keeping functions of the watch. The watch's optical sensor and UART expect to receive a serial bit transmission in the form of light pulses at a fixed bit rate. A pulse represents a binary '0' bit, and the absence of a pulse represents a binary '1' bit.

The CRT (cathode ray tube) or other scanned-pixel display of a personal computer is used to provide light pulses to the watch. Although it appears to a human viewer that all pixels of a CRT are illuminated simultaneously, the pixels are actually illuminated individually, one at a time, by an electron beam which sequentially scans each row or raster line of pixels beginning with the top raster line and ending with the bottom raster line. It is this characteristic of a CRT and of other frame-scanning display devices which is utilized to transmit serial data to the Data-Link™ watch.

To transtar data to the watch, the watch is held near and facing the CRT. The computer is programmed to display a sequence of display frames in which spaced data transmission raster lines represent individual bits of data. Lines are illuminated or not illuminated, depending on whether they represent binary '0' bits or binary '1' bits. Each line appears as a continuous pulse of a finite duration to the receiving watch. The watch recognizes an illuminated line as a binary '0' bit. It recognizes a non-illuminated line as a binary '1' bit. Generally, ten bits are transmitted in a single CRT display frame: eight data bits, a start bit, and a stop bit. As used herein, the term "display frame" means a single screen-size image made up of a matrix of pixels which form a plurality of raster lines. A display frame is generally created by sequentially illuminating or refreshing the raster lines of the display device.

The UART of the Data-Link™ watch expects to receive data at a very specific bit rate of 2048 bits per second. This can be accomplished by correctly establishing the spacing of data transmission raster lines used on the display device for data transmission. More specifically, the spacing can be controlled by varying the number of unused raster lines between the data transmission raster lines which are selected to communicate data bits to the watch. The correct spacing, however, depends on the rate at which the display device scans or updates its pixels and raster lines. Not all display devices use the same scanning rate.

Initial development of the Data-Link™ watch was carried out on display devices operating at a screen refresh rate of 60 Hz (all pixels refreshed 60 times per second). A mammal calibration routine was developed for those users with "non-standard" display devices operating at different refresh rates. The manual calibration routine consisted essentially of repetitively transmitting a test character to the watch and manually increasing or decreasing the bit rate (corresponding to a respectively decreasing or increasing data transmission raster line spacing). This system is disclosed in U.S. patent application Ser. No. 08/251224 filed May 31, 1994, in the names of Brzezinski and Dvorachek and assigned to Timex Corporation. Two factors, however, combined to make this approach less useful. First, it was found that there a number of "non-standard" display devices in use, requiring some users to manually calibrate their systems. Second, it was found that the manual calibration routine was difficult to use. Errors would occur during calibration and users had difficulty identifying the sources of those errors. Many times, users had simply not yet learned where to hold the watch relative to the display device for optimum data reception. This led to confusion and an inability for many users to successfully calibrate their systems.

SUMMARY OF THE INVENTION

The invention described herein was developed in an effort to eliminate the need for manual calibration of data transfer systems as described above. Instead, the computer which is to transmit data is programmed to automatically determine the frame scan rate or period of the connected display device. This is accomplished by setting an internal timer of the computer to generate timing signals at a predetermined frequency and to count the number of those timing signals and the number of frame scans which occur during a selected measurement period, preferably defined by the occurrence of a predetermined number of frame scans. The computer monitors the vertical retrace register associated with the display device to determine the number of frame scans which occur during the measurement period. The time scan period is derived or calculated based upon the number and predetermined frequency of the timing signals and the counted numbers of frame scans. Once the frame scan period is known, raster lines which are used to transmit data can be correctly spaced relative to the total number of available raster lines to set the desired serial transmission rate to the external receiving device.

BRIEF DESCRIPTION OF THE DRAWINGS

The same reference numerals are used throughout the disclosure to reference like components and features.

DETAILED DESCRIPTION OF THE PREFERRED EMBODIMENT

Figure 1:
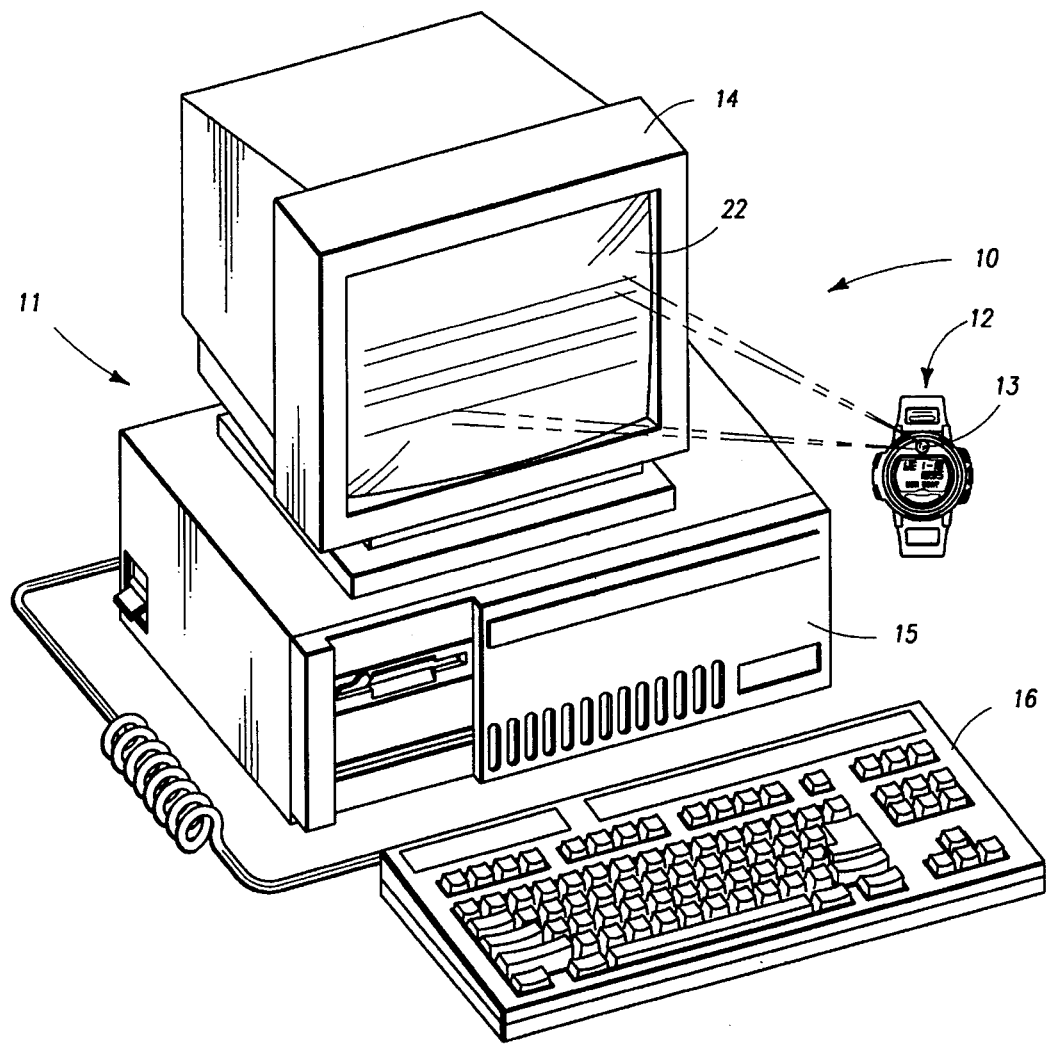
FIG. 1 is a diagrammatic illustration of a system for serially transferring data to a programmable watch from a desk-top computer according to a preferred embodiment of this invention.

FIG. 1 shows a personal electronic time management system 10 according to one embodiment of this invention. Time management system 10 includes a computer or computer system 11 and a portable or external information receiving device in the form of programmable watch 12. An optical data transmission interface is provided to enable computer system 11 to program watch 12 by transferring programming information thereto.

Watch 12 has an optical sensor 13. Computer system 11 remotely programs watch 12 by optically transmitting a serial stream of data that can be detected and deciphered by watch 12. The preferred embodiment of this invention involves a programmable watch, such as the commercially available Timex® Data-Link™ watch, which can be configured to function as a portable personal time manager. Accordingly, the invention is described herein within the context of a programmable watch. However, other forms of external devices can be used, such as pagers and personal digital assistants (PDAs). As used herein, "portable information device" means a small, portable, electronic apparatus that has limited power resources and limited rewritable memory capacity. The Data-Link™ watch, for example, is presently constructed with a rewritable memory capacity of approximately 1 Kbyte.

Figure 2:
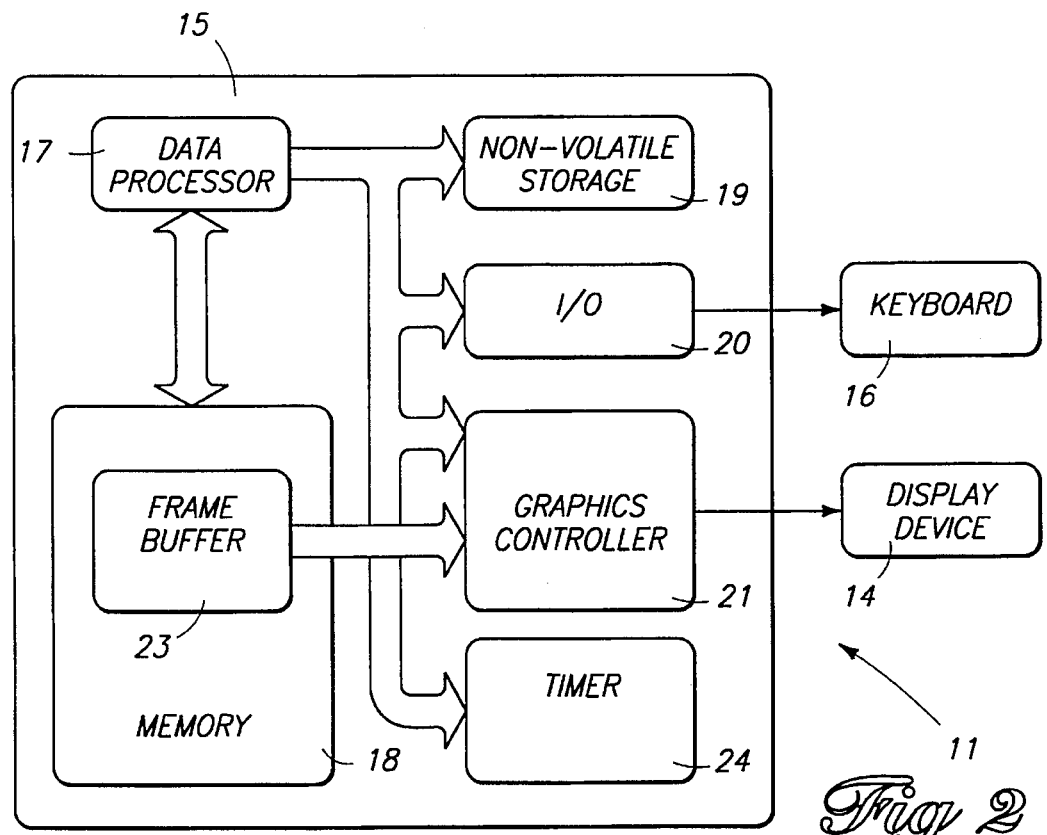
FIG. 2 is a block diagram of a computer which forms part of the system of FIG. 1.

Computer 11 includes a frame or raster scanning graphics display device 14, a central processing unit (CPU) 15 having a data processor, memory, and I/O components, and a keyboard 16 (or other input device). These components and other internal components of CPU 15 are shown in FIG. 2. As shown, CPU 15 includes a data processor 17 and associated memory 18. CPU 15 also includes non-volatile storage 19 such as a hard disk, general I/O circuits 20 for interfacing with keyboard 16, printers (not shown) and other devices, and a graphics controller 21 which interfaces CPU 15 with display device 14. CPU 15 further includes an internal general purpose timer 24 which can be used to generate periodic interrupts or for other purposes by application software running on CPU 15. Such a timer is found in most types of desktop or personal computers. The illustrated computer system is an IBM®-compatible system, although other architectures, such as Apple®-compatible systems, can be employed. In IBM®-compatible systems, the internal timer is referred to as an 8253 timer. The 8253 timer actually incorporates three timer circuits. Two are used by the computer's internal operating system, while a third is available for application programs. In accordance with the preferred embodiment of the invention, the third timer of the 8253 timer is set to generate timing signals at a predetermined frequency of 1000 cycles per second. These timing signals are monitored and counted by data processor 17 as described below.

Visual display device 14 is preferably a CRT (Cathode Ray Tube) monitor such as commonly used in personal computers. Other types of frame-scanning and raster-scanning visual display devices, which emit high-speed light transmissions, could also be used. The graphics display device displays sequential display frames containing graphical images on its monitor screen 22. A "display frame" or "frame" means a single, two-dimensional, screen-size image made up of a matrix of pixels. The pixels form a plurality of available raster lines for each display frame. The frames are normally displayed successively at an effective rate so that they appear visually static or constant on the monitor screen 22, rather than flickering. In a CRT monitor which operates at 60 Hz, all pixels of the monitor screen 22 are refreshed once every 1/60 or 0.01667 second. In contrast, the human eye only begins to perceive a non-constant flickering at a much slower frequency of about 10 Hz.

The individual pixels and raster lines of a CRT are illuminated individually by an electron beam (i.e., the cathode ray) which sequentially scans each raster line beginning with the top raster line and ending with the bottom raster line. The beam is deflected horizontally (in the line direction) and vertically (in the field direction) to scan an area of the screen to produce a single display frame. The electron beam strikes phosphors positioned at the screen of the CRT monitor to cause them to glow. The phosphors are arranged according to a desired pixel pattern, which is customarily a matrix of rows and columns. Conventional color VGA monitors typically have a resolution of 640×480 pixels or better. The process of scanning all raster lines a single time and returning the electron beam from the bottom to the top of the display is referred to as a "frame scan." The time required to accomplish a single frame scan is referred to as the "frame scan period." The frequency at which frame scans occur (the inverse of the frame scan period), is referred to as the "frame scan frequency" or "frame scan rate."

As in most modern personal computer systems, the displayed matrix of display frame pixels is specified by a corresponding matrix of data values stored within the memory 18 of CPU 15. The specific area of memory 18 designated for storing pixel information is referred to as a frame buffer, and is referenced in FIG. 2 by the numeral 23. Frame buffer 23 is associated with the frame-scanning graphics display device, having individual pixel storage locations corresponding respectively to individual display frame pixels. Graphics controller 21 reads pixel information from frame buffer 23 during each CRT scan to determine the color and intensity of each display frame pixel. Data processor 17 writes to frame buffer 23 to display desired or specified patterns on CRT 14.

The linear scanning electron beam of CRT 14 is utilized to transmit serial data to programmable watch 12. Specifically, computer 11 uses selected, spaced raster lines of CRT 14 for serial bit transmission to watch 12. Application software loaded in CPU 15 generates a sequence of display frames having changing patterns of raster lines that are displayed on CRT 14. The lines appear at optical sensor 13 as serial data. Watch 12, through optical sensor 13, monitors the illumination of the raster lines of the sequential display frames to reconstruct the transmitted data.

Figure 3:
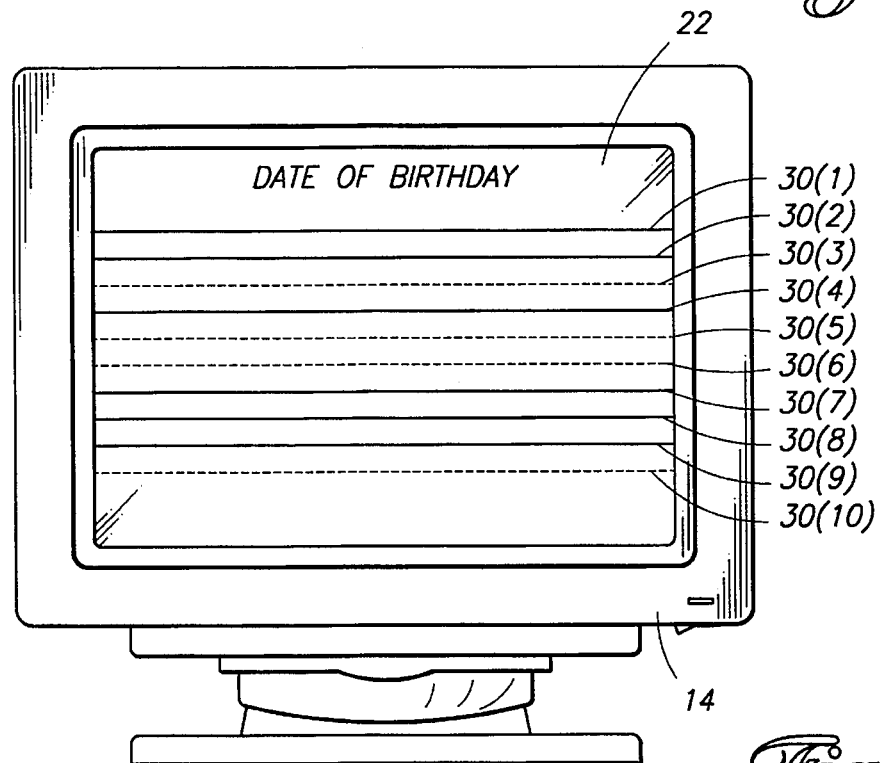
FIG. 3 is diagrammatic front view of a CRT monitor depicting a display frame having contiguously-scanned lines used to convey bits of information to the programmable watch.

FIG. 3 shows a specific pattern of selected and spaced raster lines used to transmit data to watch 12. Assuming that each frame transmits a single 8-bit byte with start and stop bits, ten raster lines 30(1)–30(10) (out of a much larger total number of available raster lines) are selected for transmitting data. These raster lines will be referred to herein as "data transmission raster lines," as opposed to other, intervening raster lines which will be referred to as "unused raster lines." Solid lines in FIG. 3 represent data transmission raster lines which are illuminated. Dashed raster lines in FIG. 3 represent data transmission raster lines which are not illuminated. Each data transmission raster line position conveys one data bit of information. Bits having a first binary value, such as a value '0', are represented by illuminated data transmission lines (e.g., lines 30(1), 30(2), 30(4), and 30(7)30(9)) and bits having, a second binary value, such as a value '1', are represented by non-illuminated data transmission lines (as illustrated pictorially by the dashed lines 30(3), 30(5), 30(6), and 30(10)). The data transmission raster lines are spaced at selected intervals, with intervening unused or non-selected raster lines, to produce a desired temporal spacing appropriate for the data receiving electronics of watch 12.

For each programming instruction or data to be transmitted to the watch, the software resident in the CPU 15 causes the CRT monitor 14 to selectively illuminate the appropriate data transmission raster lines representing '0' bits by scanning the associated pixels. The selected data transmission lines that represent '1' bits are left non-illuminated. The middle eight lines 30(2)–30(9) represent one byte of programming information being optically transmitted to watch 12. Top line 30(1) represents a start bit and bottom line 30(10) represents a stop bit that are used for timing and error detection. Because of the scanning nature of the cathode ray of CRT monitor 14, these patterns produce a serial light emission from CRT monitor 14 which is representative of a serial bit stream. Each display frame represents one byte. A new line grouping is presented for each sequential display frame so that each such display frame represents a different data byte.

Figure 4:
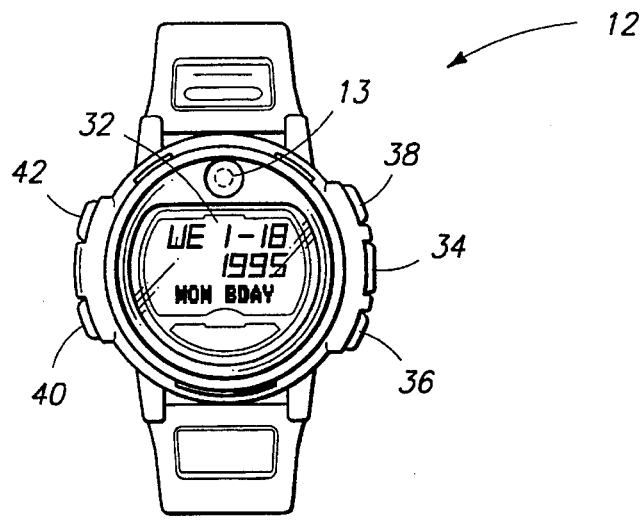
FIG. 4 is a diagrammatic front view of the programmable watch of FIG. 1.

FIG. 4 shows an external face of the programmable watch 12, which is illustrated for discussion purposes as the Timex® Data-Link™ watch. It is noted that other watch constructions as well as other portable information devices can be used in the context of this invention. Watch 12 includes a small display 32 (such as an LCD), a mode select button 34, a set/delete button 36, next/previous programming buttons 38 and 40, and a display light button 42. Optical sensor 13 is positioned adjacent to display 32. In the programming mode, display 32 indicates the programming option, and what data is being entered therein. During the normal operational mode, display 32 shows time of day, day of week, or any other function common to watches.

Figure 5:
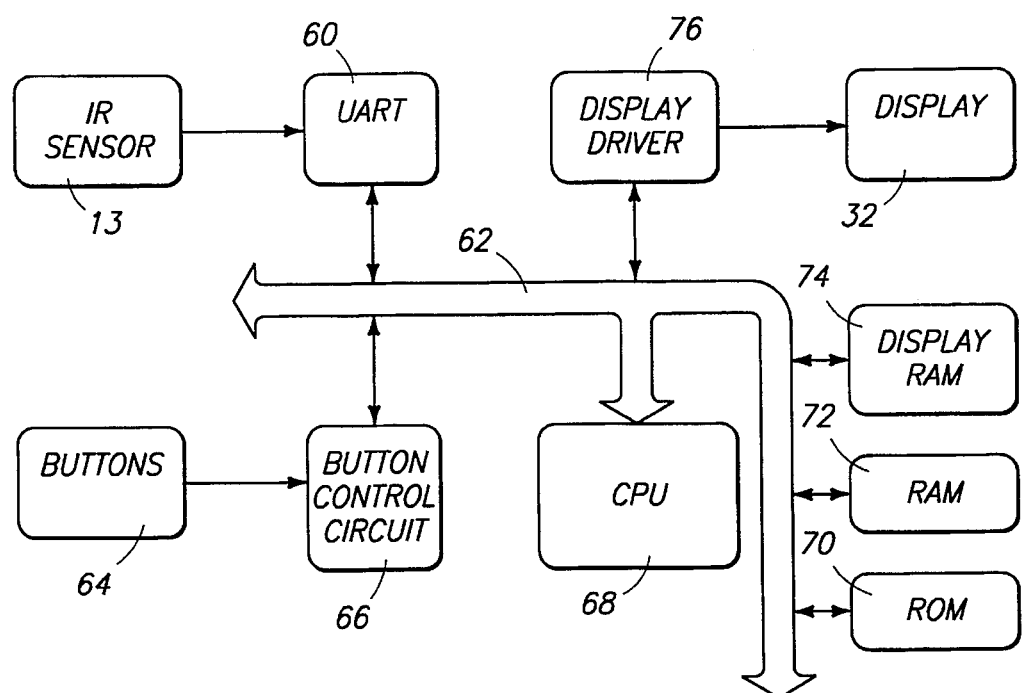
FIG. 5 is a block diagram of an electronic configuration of the programmable watch of FIG. 1.

Referring now to FIG. 5, light sensor 13 of watch 12 is coupled to a digital serial receiver or UART 60. UART 60 may be a conventional, off-the-shelf circuit which receives data in eight-bit words surrounded by start and stop bits. The UART decodes the optical patterns to extract the data bits transmitted from the computer. Watch 12 includes conversion circuitry (not shown) to produce a level-based serial signal from the edge-based signal generated by computer 11 and CRT 14. The UART is coupled to an internal bus 62, which is preferably an eight-bit bus. Inputs received from the control buttons on the watch, referenced generally by box 64, are detected and deciphered by button control circuit 66 and placed on bus 62. The watch also includes a CPU (Central Processing Unit) 68 for performing the data processing tasks, a ROM (Read Only Memory) 70 for storing initial power-up programs and other identification information, and a RAM (Random Access Memory) 72 for data storage. ROM 70 has an example capacity of approximately 16 Kbytes, while RAM 72 has an example capacity of 1 Kbyte. A display RAM 74 is provided to temporarily store data used by display driver 76 to depict visual information on display 32. These components, including the UART circuit, are preferably incorporated into a single microprocessor-based integrated circuit. One appropriate microprocessor IC is available from Motorola Corporation as model MC68HC05HG.

To program the watch, the computer is first loaded with a compatible time management software and optical pattern generating software. One example time management software is Microsoft's® Schedule+™ for Windows® and a suitable optical pattern generating software is Timex® Data-Link™ communications software. The user selects a desired option from a menu of choices displayed on the monitor in a human-intelligible form. For instance, suppose the user wants to enter his/her appointments and tasks for the month of January, including a reminder for his/her mother's birthday on Jan. 18, 1995. The user inputs the scheduling information on the computer using a keyboard and/or mouse input device. The user then sets the watch to a programming mode using control buttons 34–40 and holds optical sensor 13 facing the monitor screen 22. A sequence of changing optical patterns having horizontal contiguously-scanned lines begin to flash across the monitor screen as shown in FIG. 3 to optically transmit data regarding the various appointments and tasks. In about 20 seconds, the system will have transmitted as many as 70 entries, including the birthday reminder.

Referring back to FIG. 3, note again that the spacing of the data transmission raster lines relative to the overall total of raster lines establishes the transmitted bit rate. For example, the Timex Data-Link™ watch currently receives data at a bit rate of 2048 bits per second. Accordingly, the successive data transmission raster lines should occur at a temporal spacing of ¹⁄₂₀₄₈ seconds or 488 microseconds. Assuming a 60 Hz scan rate and 480 total data transmission and unused raster lines, individual raster lines of the display device are temporally spaced from each other by approximately $$\frac{0.9}{60 \times 480} = 35 \text{ microseconds}$$

(where the CRT's vertical retrace is assumed to occupy 10% of the total frame refresh period). Accordingly, the data transmission raster lines representing individual data bits should be spaced from each other by 13 unused raster lines, to occur every 14 raster lines (488/35). This spacing will result in the data transmission raster lines occurring temporally at a rate of 2048 times per second.

Unfortunately, this calculation is dependent upon the display device's frame scan rate or period. As mentioned above, this may vary from computer to computer. It would be desirable to measure the frame scan period at installation. Most graphic controllers have a vertical retrace register which indicates that the associated CRT is performing a vertical refresh. Theoretically, this register could be monitored and the time between vertical retraces measured to determine the time consumed for each CRT display frame. In practice, however, it is difficult to make this measurement with accuracy within the programming constraints of a conventional personal computer.

Figure 6:
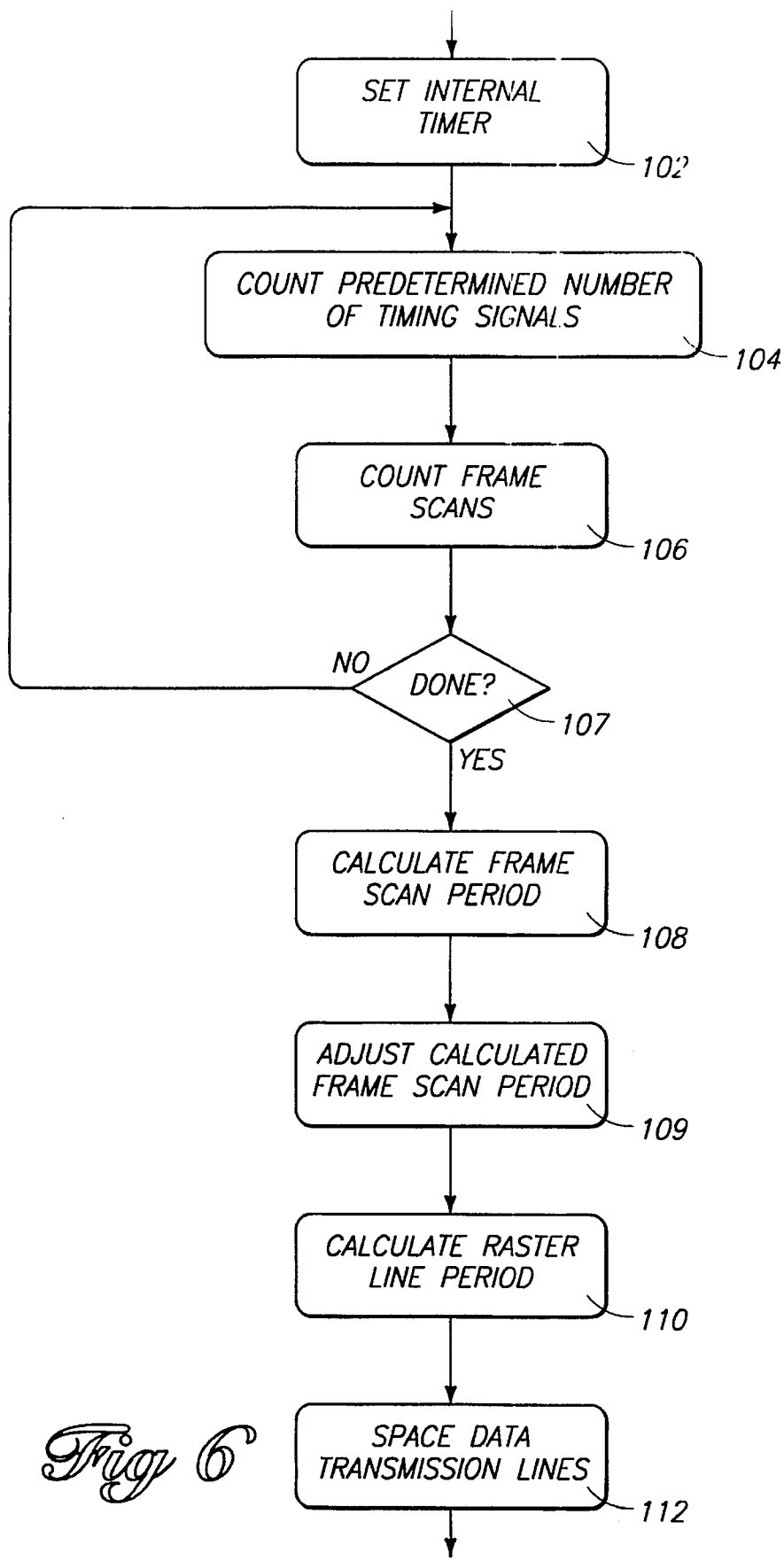
FIG. 6 is a flow diagram of a method comprising preferred steps for calibrating data transmission lines on a frame-scanning display device in accordance with the invention.

FIG. 6, however, illustrates a method of calibrating the spacing of data transmission raster lines of a CRT such as that described above to establish a desired serial transmission bit rate. CPU 15 and programmed data processor 17 form the means for performing the steps shown. A first step 102 comprises setting internal timer 24 to generate timing signals at a predetermined frequency. This frequency is preferably significantly greater than the frame scan frequency to be measured. In preferred implementations, the timing signal frequency is at least 10 times greater than the frame scan frequency or at least 1000 cycles per second, with a frequency of 1000 cycles per second being most preferred.

A subsequent step 104 comprises counting a predetermined number of frame scans, defining a selected measurement period. The predetermined number of frame scans is preferably equal to at least 250. The preferred embodiment counts 500 frame scans. Step 104 is accomplished by monitoring the vertical refresh register associated with CRT 14 and counting the number of vertical refreshes. This number corresponds to the number of frame scans of CRT 14.

A step 106 comprises counting the number of timing signals from timer 24 which occur while counting the predetermined number of frame scans. Timing cycles could alternatively be counted in response to interrupts generated by internal timer 24.

Decision block 107 indicates that steps 104 and 106 are repeated until the predetermined number of frame signals has been counted. Note that similar results could be obtained by counting the number of frame scans occurring during a predetermined number of timing signals.

The steps described above allow a subsequent step 108 of deriving a frame scan period. This calculation is based upon the predetermined frequency of the timing signals, the predetermined number of frame scans, and the number of timing signals counted while counting the predetermined number of frame scans. More specifically, this calculation is performed by dividing the predetermined number of frame scans counted by the predetermined frequency of the timing signals and the number of timing signals counted as follows:

$$Pf = \frac{\text{number}}{\text{freq} \times \text{framescans}},$$

where Pf is the frame scan period, framescans is the predetermined number of frame scans, freq is the predetermined frequency of the timing signals, and number is the number of timing signals counted during the predetermined number of frame scans.

For example, assume that the timer has been set to generate timing signals at 1000 cycles per second, that these timing signal are to be counted for 500 frame scans, and that 7143 timing signals are detected during these 500 frame scans (flamescans=500, freq=1000, and number=7143). Using the above equation, $$Pf = \frac{7143}{1000 \times 500} = 0.014286 \text{ seconds}$$

or 70 cycles/second.

A step 109 comprises adjusting the derived frame scan period by a predetermined factor to account for the vertical retrace period of CRT 14. The resulting number represents the actual time the CRT spends in tracing its raster lines. It has been found that most CRT's use approximately 10% of their total frame scan period in moving the electron beam from the bottom to the top of the screen between scans of the screen. Accordingly, in the preferred embodiment the predetermined factor is equal to approximately 90% of the derived frame scan period: Pa=Pf×0.90=0.0128574 seconds, where Pa is the adjusted frame scan period.

A further step 110 comprises deriving the display device raster line period based upon the derived frame scan period. This is done by dividing the adjusted frame scan period by the total number of available raster lines per display frame:

$$Pr = \frac{Pa}{\text{lines}} = 26.8 \text{ microseconds},$$

where Pr is the raster line period, Pa is the adjusted frame scan period (0.0128674 seconds), and lines is the total number of available lines (assumed in this case to equal 480).

Step 112 includes spacing the data transmission raster lines relative to each other within the total number of available raster lines in relationship to the derived frame scan period. If a bit rate of 2048 bits per second is to be achieved, the data transmission raster lines must be temporally spaced at intervals of approximately 488 microseconds. In practice, the data transmission lines are spaced in accordance with the following equation:

$$\text{rasterline} = \frac{\text{bitnumber}}{Pr \times \text{bitrate}},$$

wherein bitnumber is an integer indicating the relative position of the bit in a display frame and rasterline is the number of the raster line (from among all available raster lines numbered consecutively from top to bottom) at which the bit should be displayed. Using the example numbers discussed above, the first bit in a display frame would be positioned at the 18th raster line:

$$\frac{1}{.0000268 \times 2048} \approx 18.$$

The second bit in a display frame would be positioned at the 36th raster line:

$$\frac{2}{.0000268 \times 2048} \approx 36.$$

This spacing establishes the desired serial transmission rate to watch 12.

It should be noted that not all of the above calculations need be explicitly implemented. Rather, the steps in determining the correct spacing of data transmission raster lines may be integrated in a single calculation in which the above steps are only implicitly carried out. Specifically, while a step of calculating or deriving a frame scan period is explicitly recited herein, this and other individual mathematical steps may be implicit, rather than explicit, in the calculations carried out by computer 11. Furthermore, the preferred implementation of the invention implements calculations using integer math rather than the floating point math used above. When using integer math, it may be more convenient to make calculations in terms of frequencies then in terms of periods as in the discussion above.

The steps above allow an application program which is to transfer data via selected data transmission raster lines of a CRT to automatically determine the frame scan rate or period of the CRT and to therefore set the correct temporal spacing of the data transmission raster lines to establish a desired bit transmission rate. This can be done without user involvement and thus is a great improvement over previous methods of calibrating bit transmission rates.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. In a computer system which uses selected data transmission raster lines of a frame-scanning display device for serial bit transmission to an external receiving device, wherein the data transmission raster lines are selected from a total number of available raster lines per display frame, a method of calibrating the spacing of the data transmission raster lines relative to each other within the total number of available raster lines to establish a desired serial transmission bit rate, the method comprising the following steps:

setting an internal timer of the computer system to generate timing signals at a predetermined frequency;

counting the number of the timing signals which occur during a selected measurement period;

counting the number of frame scans of frame-scanning display device which occur during the selected measurement period;

spacing the data transmission raster lines relative to each other within the total number of available raster lines in relationship to the counted number of timing signals and the counted number of frame scans, said spacing establishing the desired serial transmission rate to the external receiving device.

2. A method as recited in claim 1 wherein the frame-scanning display device has a frame scan frequency, the setting step further comprising setting the internal timer to generate the timing signals at a frequency that is significantly greater than the frame scan frequency.

3. A method as recited in claim 1 wherein the frame-scanning display device has a frame scan frequency, the frequency of the timing signals being at least ten times greater than the frame scan frequency.

4. A method as recited in claim 1 wherein:

the selected measurement period is defined by the occurrence of a predetermined number of frame scans;

the predetermined number of frame scans is at least 250.

5. A method as recited in claim 1 wherein the selected measurement period is defined by the occurrence of a predetermined number of frame scans.

6. A method as recited in claim 1 wherein the step of spacing the data transmission raster lines comprises dividing the counted number of timing signals by the product of the counted number of framescans and the frequency of the timing signals.

7. A method as recited in claim 1 and further comprising:

deriving a frame scan period of the frame-scanning display device based upon the predetermined frequency of the timing signals, the counted number of timing signals, and the counted number of frame scans;

adjusting the derived frame scan period by a predetermined factor to account for a vertical retrace period of the frame-scanning display device.

8. In a computer system which uses selected data transmission raster lines of a frame-scanning display device for serial bit transmission to an external receiving device, wherein the data transmission raster lines are selected from a total number of available raster lines per display frame, a method of calibrating the spacing of the data transmission raster lines relative each other within the total number of available raster lines to establish a desired serial transmission bit rate, the method comprising the following steps:

setting an internal timer of the computer system to generate timing signals at a predetermined frequency;

counting the number of the timing signals which occur during a selected measurement period;

counting the number of frame scans of the frame-scanning display device which occur during the selected measurement period;

deriving a frame scan period of the frame-scanning display device based upon the predetermined frequency of the timing signals, the counted number of timing signals, and the counted number of frame scans;

deriving a raster line period by dividing the derived frame scan period by the total number of available raster lines per display frame; and spacing the data transmission raster lines relative to each other within the total number of available raster lines in relationship to the raster line period, said spacing establishing the desired serial transmission rate to the external receiving device.

9. A method as recited in claim 8 and further comprising adjusting the derived frame scan period by a predetermined factor to account for a vertical retrace period of the frame-scanning display device.

10. A method as recited in claim 8 and further comprising adjusting the derived frame scan period by a predetermined factor to account for a vertical retrace period of the frame-scanning display device, wherein the predetermined factor is equal to approximately 10% of the derived frame scan period.

11. A method as recited in claim 8 wherein the predetermined frequency is at least 1000 timing signals per second.

12. A method as recited in claim 8 wherein selected measurement period is defined by the occurrence of a predetermined number of frame scans, the predetermined number of frame scans being equal to at least 500.

13. A method as recited in claim 8 wherein the step of counting the number of frame scans includes monitoring a vertical refresh register associated with the frame-scanning display device.

14. A computer system which uses selected data transmission raster lines of a frame-scanning display device for serial bit transmission to an external receiving device, the computer system comprising:

a data processor;

a frame-scanning display device having a total number of available raster lines per display frame;

an internal timer which is set to generate timing signals at a predetermined frequency;

the data processor being programmed to count the number of timing signals and the number of frame scans of the frame-scanning display device which occur during a selected measurement period;

the data processor being further programmed to space the data transmission raster lines relative to each other within the total number of available raster lines as they appear on the frame-scanning display device based upon the predetermined frequency of the timing signals, the counted number of timing signals, and the counted number of frame scans, said spacing establishing a desired serial transmission bit rate to the external receiving device.

15. A computer system as recited in claim 14 wherein the frame-scanning display device has a frame scan frequency, the frequency of the timing signals being significantly greater than the frame scan frequency.

16. A computer system as recited in claim 14 wherein the frame-scanning display device has a frame scan frequency, the frequency of the timing signals being at least ten times greater than the frame scan frequency.

17. A computer system as recited in claim 14 wherein the selected measurement period is defined by the occurrence of a predetermined number of frame scans, the predetermined number of frame scans being equal to at least 250.

18. A computer system as recited in claim 14 wherein the data processor calculates a frame scan period by dividing the counted number of timing signals by a product of the predetermined frequency of the timing signals and the counted number of frame scans.

19. A computer system as recited in claim 14 wherein:

the data processor calculates a frame scan period by dividing the counted number of timing signals by a product of the predetermined frequency of the timing signals and the counted number of frame scans;

the data processor determines spacing of the data transmission raster lines by dividing the frame scan period by the total number of available raster lines per display frame to determine a raster line period.

20. A computer system as recited in claim 14 wherein:

the data processor derives a frame scan period by dividing the counted number of timing signals by a product of the predetermined frequency of the timing signals and the counted number of frame scans;

the data processor is further programmed to adjust the derived frame scan period by a predetermined factor to account for a vertical retrace period of the frame-scanning display device.

21. A computer system as recited in claim 14 wherein the data processor counts the number of frame scans by monitoring a vertical refresh register associated with the frame-scanning display device.

22. A computer system which uses selected data transmission raster lines of a frame-scanning display device for serial bit transmission to an external receiving device, the computer system comprising:

a data processor;

a frame-scanning display device having a total number of available raster lines per display frame;

an internal timer which is set to generate timing signals at a predetermined frequency;

the data processor being programmed to count the number of timing signals and the number of frame scans of the frame-scanning display device which occur during a selected measurement period;

the data processor being further programmed to derive a frame scan period of the frame-scanning display device by dividing the counted number of timing signals by a product of the predetermined frequency of the timing signals and the counted number of frame scans;

the data processor being further programmed to derive a raster line period by dividing the derived frame scan period by the total number of available raster lines per display frame;

the data processor being further programmed to space the data transmission raster lines relative to each other within the total number of available raster lines as they appear on the frame-scanning display device in relationship to the derived frame scan period, said spacing establishing a desired serial transmission bit rate to the external receiving device.

23. A computer system as recited in claim 22 wherein the data processor is further programmed to adjust the derived frame scan period by a predetermined factor to account for a vertical retrace period of the frame-scanning display device.

24. A computer system as recited in claim 22 wherein the data processor is further programmed to adjust the derived frame scan period by a predetermined factor to account for a vertical retrace period of the frame-scanning display device, wherein the predetermined factor is equal to approximately 10% of the derived frame scan period.

25. A computer system as recited in claim 22 wherein the predetermined frequency is at least 1000 timing signals per second.

26. A computer system as recited in claim 22 wherein the selected measurement period is defined by the occurrence of a predetermined number of frame scans, the predetermined number of frame scans being equal to at least 500.

27. A computer system as recited in claim 22 wherein the computer system further comprises a vertical refresh register associated with the frame-scanning display device, the data processor being programmed to count frame scans by monitoring the vertical refresh register.

* * * * *